US008077690B2

(12) United States Patent
Sartori et al.

(10) Patent No.: US 8,077,690 B2
(45) Date of Patent: Dec. 13, 2011

(54) RESOURCE ALLOCATION IN CELLULAR COMMUNICATION SYSTEMS

(75) Inventors: Philippe J. Sartori, Algonquin, IL (US); Kevin L. Baum, Rolling Meadows, IL (US); Brian K. Classon, Palatine, IL (US); Robert T. Love, Barrington, IL (US); Vijay Nangia, Algonquin, IL (US); Mark Conrad Cudak, Rolling Meadows, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1287 days.

(21) Appl. No.: 11/210,939

(22) Filed: Aug. 24, 2005

(65) Prior Publication Data

US 2007/0110104 A1    May 17, 2007

(51) Int. Cl.
H04B 7/216 (2006.01)

(52) U.S. Cl. ...................................... 370/342; 375/260

(58) Field of Classification Search .................. 370/480, 370/208, 329–338, 341–346; 375/132–137
See application file for complete search history.

(56) References Cited

U.S. PATENT DOCUMENTS

| | | | |
|---|---|---|---|
| 6,064,662 A | 5/2000 | Gitlin et al. | |
| 6,567,416 B1 | 5/2003 | Chuah | |
| 6,598,200 B1 * | 7/2003 | Greenwood et al. | 714/774 |
| 2002/0118666 A1 | 8/2002 | Stanwood et al. | |
| 2002/0119781 A1 | 8/2002 | Li et al. | |
| 2002/0172184 A1 * | 11/2002 | Kim et al. | 370/344 |
| 2002/0178449 A1 * | 11/2002 | Yamamoto et al. | 725/56 |
| 2003/0003920 A1 * | 1/2003 | Sebastian | 455/452 |
| 2003/0189918 A1 | 10/2003 | Das et al. | |
| 2004/0095907 A1 | 5/2004 | Agee et al. | |
| 2004/0127223 A1 * | 7/2004 | Li et al. | 455/446 |
| 2004/0258134 A1 * | 12/2004 | Cho et al. | 375/131 |
| 2005/0085236 A1 * | 4/2005 | Gerlach et al. | 455/450 |
| 2005/0111397 A1 | 5/2005 | Attar et al. | |
| 2005/0111406 A1 | 5/2005 | Pasanen et al. | |
| 2005/0232181 A1 | 10/2005 | Park et al. | |
| 2005/0254461 A1 * | 11/2005 | Shin et al. | 370/329 |
| 2006/0013325 A1 | 1/2006 | Agrawal et al. | |

(Continued)

FOREIGN PATENT DOCUMENTS

CN    1610333 A    4/2005

(Continued)

OTHER PUBLICATIONS

Yaghoobi; Intel Technology Journal, vol. 08, Issue 03, Published, Aug. 20, 2004; ISSN 1535-864X; "Scalable OFDMA Physical Layer in IEEE 802.16 WirelessMAN"; 14 pages.

(Continued)

Primary Examiner — Thai Hoang
(74) Attorney, Agent, or Firm — Roland K. Bowler, II

(57) ABSTRACT

A method for assigning resources to frequency selective (FS) and frequency non-selective (FNS) users, for example, in an orthogonal frequency-division multiplexing (OFDM) wireless communication system, including assigning a first frequency resource to at least one FS user during a time interval, wherein the first frequency resource includes at least two near contiguous sub-carriers, and assigning a second frequency resource to at least one FNS user during the same time interval, the second frequency resource includes for each FNS user at least two non-contiguous sub-carriers, wherein the first and second frequency resources are part of a common frequency channel.

23 Claims, 5 Drawing Sheets

U.S. PATENT DOCUMENTS

| | | | |
|---|---|---|---|
| 2006/0039274 A1* | 2/2006 | Park et al. | 370/208 |
| 2006/0203707 A1* | 9/2006 | Lee et al. | 370/208 |
| 2006/0245384 A1 | 11/2006 | Talukdar et al. | |
| 2007/0058595 A1 | 3/2007 | Classon et al. | |
| 2007/0097887 A1 | 5/2007 | Kim et al. | |
| 2007/0140102 A1* | 6/2007 | Oh et al. | 370/208 |
| 2007/0165694 A1* | 7/2007 | Parizhsky et al. | 375/132 |
| 2007/0211657 A1 | 9/2007 | McBeath et al. | |
| 2007/0214400 A1 | 9/2007 | Smith et al. | |
| 2008/0049690 A1 | 2/2008 | Kuchibhotla et al. | |
| 2008/0084845 A1 | 4/2008 | Kuchibhotla et al. | |
| 2009/0268695 A1 | 10/2009 | Zhao et al. | |
| 2009/0316614 A1 | 12/2009 | Kim et al. | |

FOREIGN PATENT DOCUMENTS

| | | |
|---|---|---|
| EP | 1526674 A1 | 4/2005 |
| JP | 11355195 A | 12/1999 |
| JP | 2005130491 A1 | 5/2005 |
| JP | 2006505219 A | 2/2006 |
| WO | 0241520 A2 | 5/2002 |
| WO | 0249305 A2 | 6/2002 |
| WO | 2004042954 A1 | 5/2004 |
| WO | 2004095851 A2 | 11/2004 |
| WO | 2004100569 A2 | 11/2004 |
| WO | 2005109705 A1 | 11/2005 |
| WO | 2006039812 A1 | 4/2006 |
| WO | 2006065069 A1 | 6/2006 |
| WO | 2006102746 A1 | 10/2006 |
| WO | 2006105004 A2 | 10/2006 |
| WO | 2006105005 A2 | 10/2006 |

OTHER PUBLICATIONS

Japanese Patent Application No. 2006-201454; Motorola Docket No. CS27374ML; Resource Allocation in Cellular Communication Systems; Decision of Rejection; Sep. 8, 2009; 5 pages.

Chinese Patent Applcation No. 200680030579.X "Notification of the First Office Action" May 11, 2010, 11 pages.

Patent Cooperation Treaty, "PCT Search Report and Written Opinion of the International Searching Authority" for International Application No. PCT/US2007/074064 Mar. 14, 2008, 19 pages.

United States Patent and Trademark Office, "Non-Final Rejection" for U.S. Appl. No. 11/466,720, filed Jun. 29, 2009, 17 pages.

Japanese Patent Office, "Notification of Reasons for Rejection" for Application No. 2007-216057 Nov. 27, 2009, 5 pages.

United States Patent and Trademark Office, "Final Rejection" for U.S. Appl. No. 11/466,720, filed Apr. 5, 2010, 18 pages.

United States Patent and Trademark Office, "Non-Final Rejection" for U.S. Appl. No. 11/466,720, filed Feb. 2, 2011, 29 pages.

3GPP TSG RAN1 #46bis, Seoul, South Korea, Oct. 9-13, 2006; Nokia; Reference Signals for Mixed Carrier MBMS; R1-062827; 6 pages.

Patent Cooperation Treaty, "PCT Search Report and Written Opinion of the International Searching Authority" for International Application No. PCT/US2007/076941 Aug. 21, 2008, 14 pages.

3GPP TS 36.211v8.7.0 (May 2009) "3rd Generation Partnership Project; Technical Specification Group Radio Access Network; Evolved Universal Terrestrial Radio Access (E-UTRA); Physical Channels and Modulation (Release 8)" 83 pages.

3GPP TSG RAN1#45, Shanghai, China, May 8-12, 2006; EUTRA Downlink Distributed Multiplexing and Mapping Rules TP; R1-061173; XP007903801.

* cited by examiner

RESOURCE ALLOCATION IN CELLULAR COMMUNICATION SYSTEMS

FIELD OF THE DISCLOSURE

The present disclosure relates generally to wireless multi-carrier communications and more particularly to resource allocation in wireless multi-carrier communication systems having communication terminals utilizing both frequency selective (FS) and frequency non-selective (FNS) scheduling techniques, devices and methods.

BACKGROUND OF THE DISCLOSURE

Frequency-Selective (FS) techniques have the potential for significantly increasing performance in wireless multi-carrier communication systems. Such techniques are expected to be included in the currently developing Third Generation Partnership Project (3GPP) Evolved—(Evolved Universal Terrestrial Radio Access (UTRA) standards. FS techniques improve system performance based on knowledge of the frequency profile of the channel, for example, by changing the modulation and coding scheme with frequency. In contrast, Frequency Non-Selective (FNS) techniques use a frequency-averaged channel quality information report.

FS techniques are generally not applicable to all user equipment (UE) in the network. For example, it is difficult to track time variations of the channel for user equipment moving at relatively high velocities. Some system base stations may apply FS techniques to only subsets of users to limit signaling overhead. UE in or near flat-fading conditions also may not require FS techniques because of the nature of the channel. FS techniques may also not be required for UE employing multiple-antenna techniques. FS and FNS users will therefore likely co-exist in many wireless communication systems. Therefore, there is a need for a resource assignment scheme and associated signaling that can accommodate both FS and FNS users.

The various aspects, features and advantages of the disclosure will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
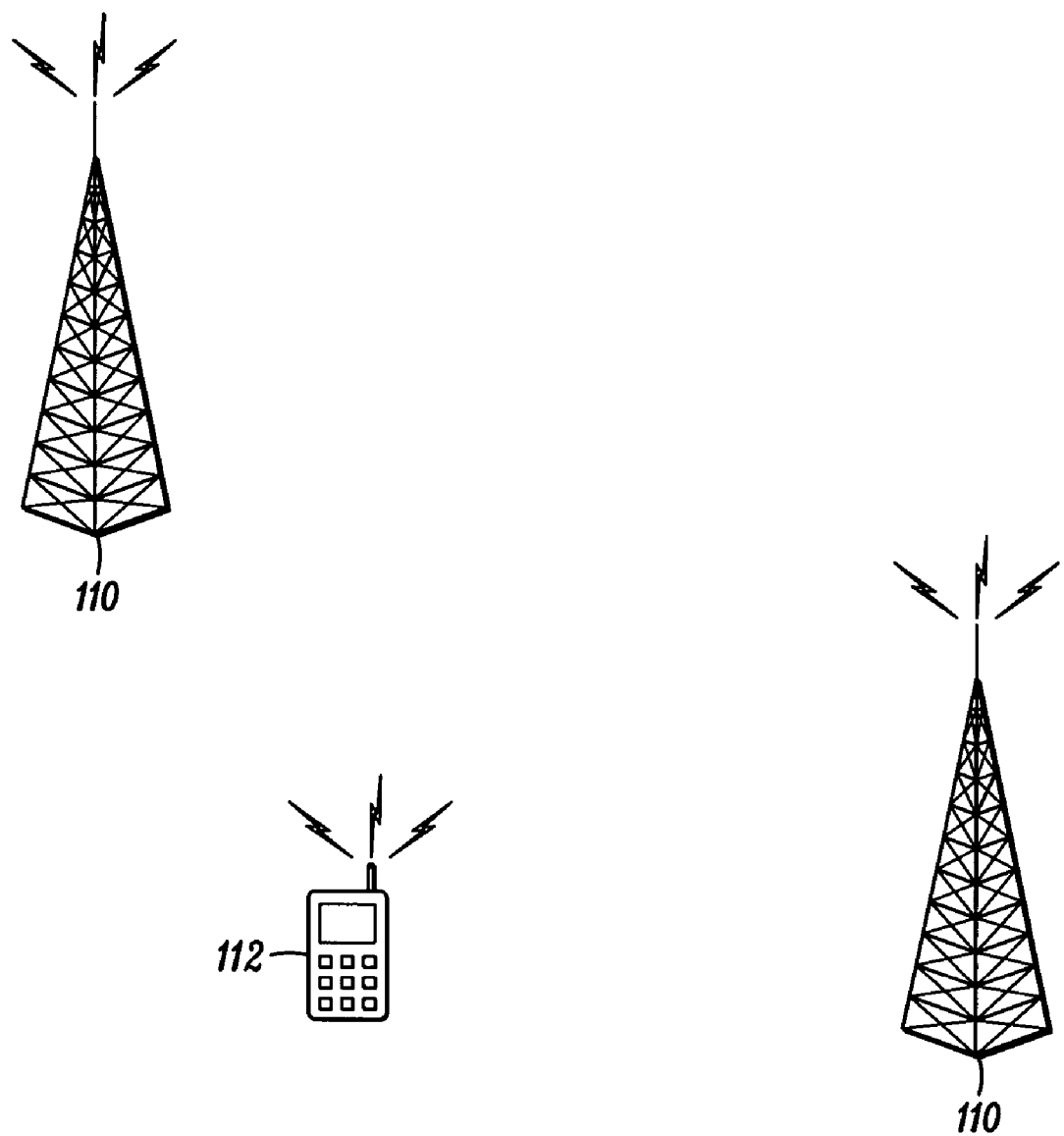
FIG. 1 is an exemplary wireless communication network.

In FIG. 1, the illustrative wireless communication system comprises a plurality of base stations 110 providing wireless communication services for corresponding cellular areas to wireless communication stations, for example, mobile terminal 112. One or more of the base stations are generally communicably coupled to a corresponding controller, which may be communicably coupled to a mobile switching station and other gateways as is known generally by those having ordinary skill in the art. The base stations each include a scheduling entity that allocates radio resources to users communicating with the network.

As suggested in the Background discussion above, Frequency Selective (FS) and Frequency Non-Selective (FNS) users will likely co-exist in many wireless communication systems. Exemplary systems include but are not limited to systems compliant with the currently developing 3GPP Evolved-UTRA standards and other Orthogonal Frequency-Division Multiplexed (OFDM) wireless communication systems. In these and other wireless communication systems supporting both FS and FNS users, the scheduling entity must generally allocate resources to the system users, typically in the form of mobile terminals or UEs. Several resource allocation schemes are discussed further below.

In one embodiment, resources are assigned to frequency selective (FS) and frequency non-selective (FNS) users, for example, in an OFDM or other wireless communication system having FS and FNS users. In one embodiment, a first frequency resource is assigned to at least one FS user during one time interval, and a second frequency resource, including at least two non-contiguous sub-carriers, is assigned to at least one FNS user during the same time interval during which the FS assignment is made. In one embodiment, the first and second frequency resources are part of a common frequency channel.

The first frequency resource assigned to each FS user includes at least two near contiguous sub-carriers. In one embodiment, near contiguous sub-carriers are adjacent or separated by not more than one sub-carrier. More generally the first frequency resource may include additional sub-carriers, though these additional sub-carriers need not necessarily be near contiguous. The second frequency resource assigned to each FNS user includes at least two non-contiguous sub-carriers. In some embodiments, the second frequency resource may also include additional sub-carriers that are not necessarily non-contiguous. In another embodiment, the at least two non-contiguous sub-carriers of the second frequency resource assigned to each FNS user are separated by not less than one quarter of the common frequency channel.

The base station performs channel coding and interleaving data for each FNS user over the correspondingly assigned second frequency resources. Channel coding and interleaving for the FS user may be on a per-sub-channel basis. Coding and interleaving for the FS user may be on a per-sub-channel basis, or across multiple sub-channels assigned to a user. For example, if the assigned sub-channels for a FS user all have similar channel quality they may all be assigned the same modulation and coding rate, and may also be channel coded and interleaved together to form a larger codeword. In all cases, a maximum codeword size may be imposed, and in some cases multiple codewords may be needed to protect either a FS or a FNS user.

Figure 2:
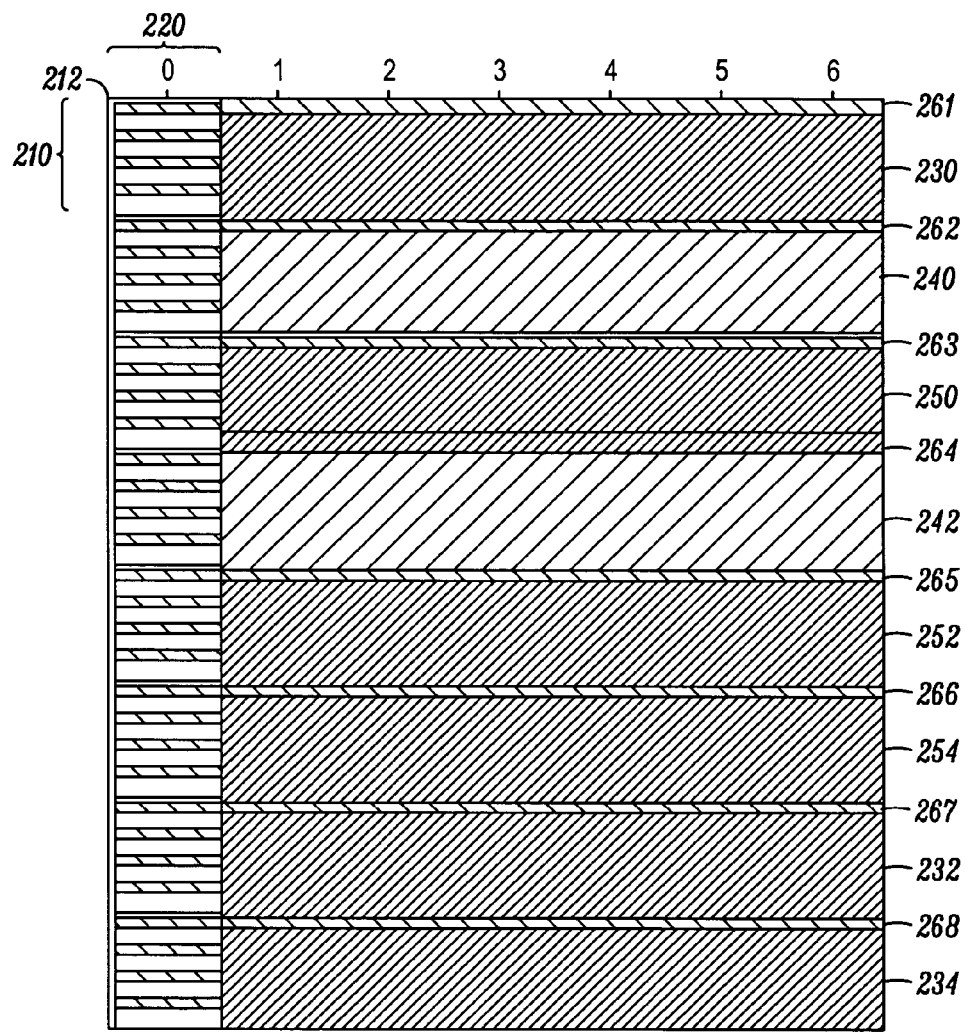
FIG. 2 is an illustrative radio frame having resources assigned to FS and FNS users.

In FIG. 2, a radio frame 200 includes multiple symbols (0-6), wherein the time is along the horizontal axis and the frequency is along the vertical axis. The illustrative frame 200 constitutes a common frequency channel comprising eight sub-channels, only one of which, sub-channel 210, is identified. In FIG. 2, each sub-channel comprises eight sub-carriers, only one of which, sub-carrier 212, is identified. In other embodiments, the frame may include more or less symbols. The frame may also have more or less sub-channels and each sub-channel may have more or less sub-carriers than illustrated in FIG. 2. In FIG. 2, the first symbol 220 is a control/pilot symbol. In one implementation, adjacent sub-carriers in the frequency domain of symbol 220 are alternately assigned pilot and control functions. In alternative embodiments, other pilot and control assignment schemes may be implemented.

In one resource assignment scheme, all sub-channels are assigned to different FS users, and one or more sub-carriers are punctured from each sub-channel for assignment to one or more FNS users. In FIG. 2, for example, sub-channels 230, 232 and 234 are assigned to a first FS user, sub-channels 240 and 242 are assigned to a second FS user, and sub-channels 250, 252 and 254 are assigned to a third FS users. At least two of the sub-carriers assigned to the FS users are near contiguous. In FIG. 2, a sub-carrier of each sub-channel assigned to the FS users, namely sub-carriers 261-268, is assigned to a single FNS user. In one assignment scheme, the sub-channels are assigned to the FS users first, and then sub-carriers are punctured from the sub-channels assigned to the FS users and assigned to the one or more FNS users. When puncturing, generally, the sub-carriers assigned to FS users may be separated by several sub-carriers within each sub-channel. In some embodiments where the user assignments to one set of users (FS or FNS) are made from a group of sub-channels before assigning to the other set of users (FNS or FS), the remaining sub-channels are re-numbered before assigning the resources to the other users. Re-numbering of the remaining resources however is not required.

In the resource allocation scheme of FIG. 2, the first frequency resource is assigned to all FS users before assigning the second frequency resource to FNS users. In one embodiment, the first frequency resource is assigned to FS users based on reported frequency signal quality information received from the FS users. In another embodiment, the second frequency resource is assigned to all FNS users before assigning the first frequency resource to any FS users. The second frequency resource is assigned to the FNS users in a manner that improves frequency diversity. The FNS user assignments may be based on interleaving or Orthogonal Variable Spreading Factor (OVFS) tree assignment techniques.

Figure 3:
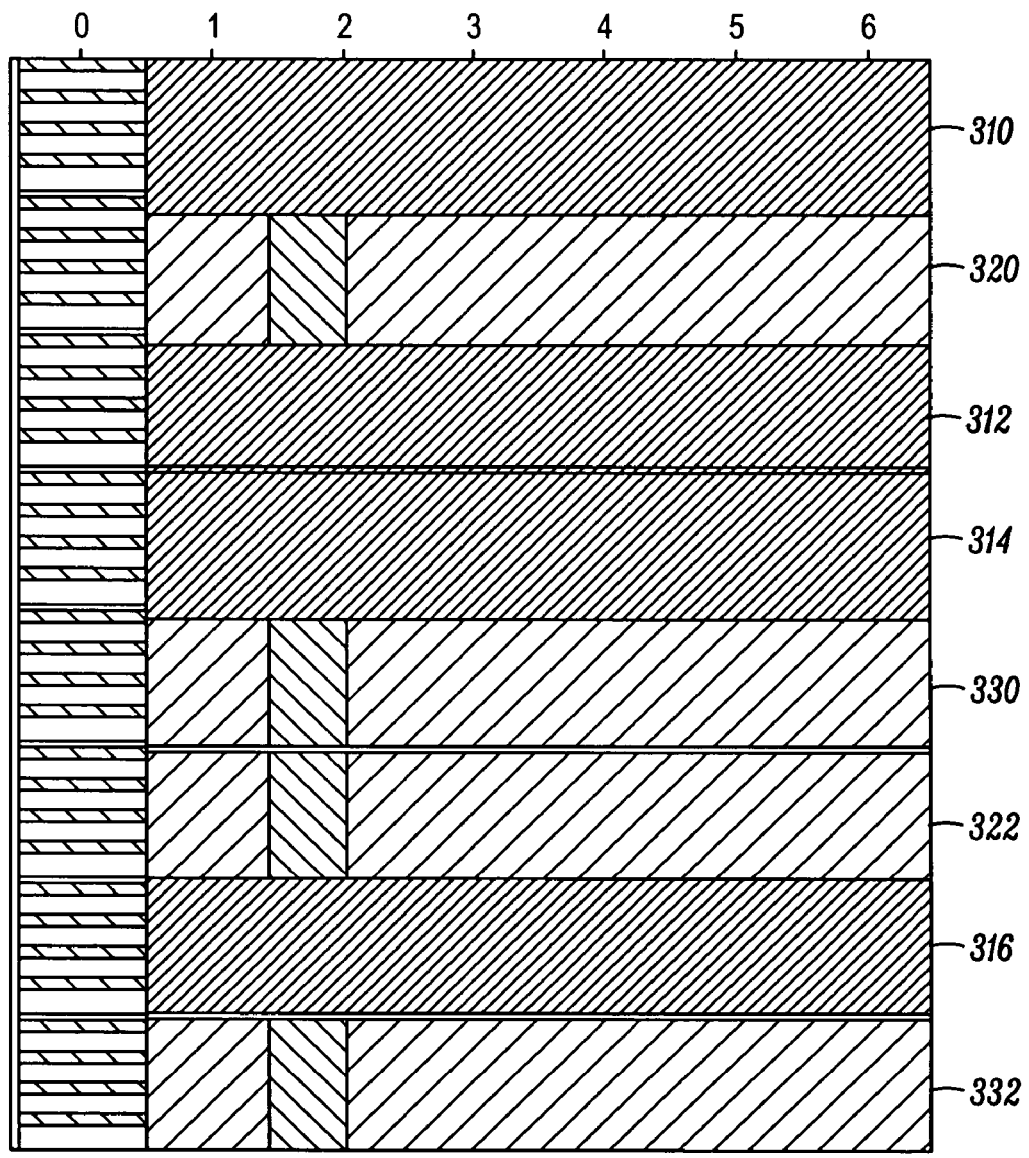
FIG. 3 is another illustrative radio frame having resources assigned to FS and FNS users.

In FIG. 3, resources are assigned to frequency selective (FS) and frequency non-selective (FNS) users in an OFDM or other wireless communication system having FS and FNS users according to another scheme. A first frequency resource is assigned to one or more FS user during a time interval, and a second frequency resource is assigned to one or more FNS user during the same time interval after assigning the first frequency resource to the FS users, wherein the second frequency resource includes, for each FNS user, at least two non-contiguous sub-channels, and wherein the first and second frequency resources are part of a common frequency channel. In FIG. 3, for example, sub-channels 310, 312, 314 and 316 are first assigned to an FS user. Thereafter, non-contiguous sub-channels 320 and 322 are assigned to a first FNS user, and non-contiguous sub-channels 330 and 332 are assigned to another FNS user. As discussed above, the first frequency resource may be assigned to the one or more FS users based on reported frequency signal quality information received from FS users, and the second frequency resource may be assigned to the FNS users in a manner that improves frequency diversity.

Figure 4:
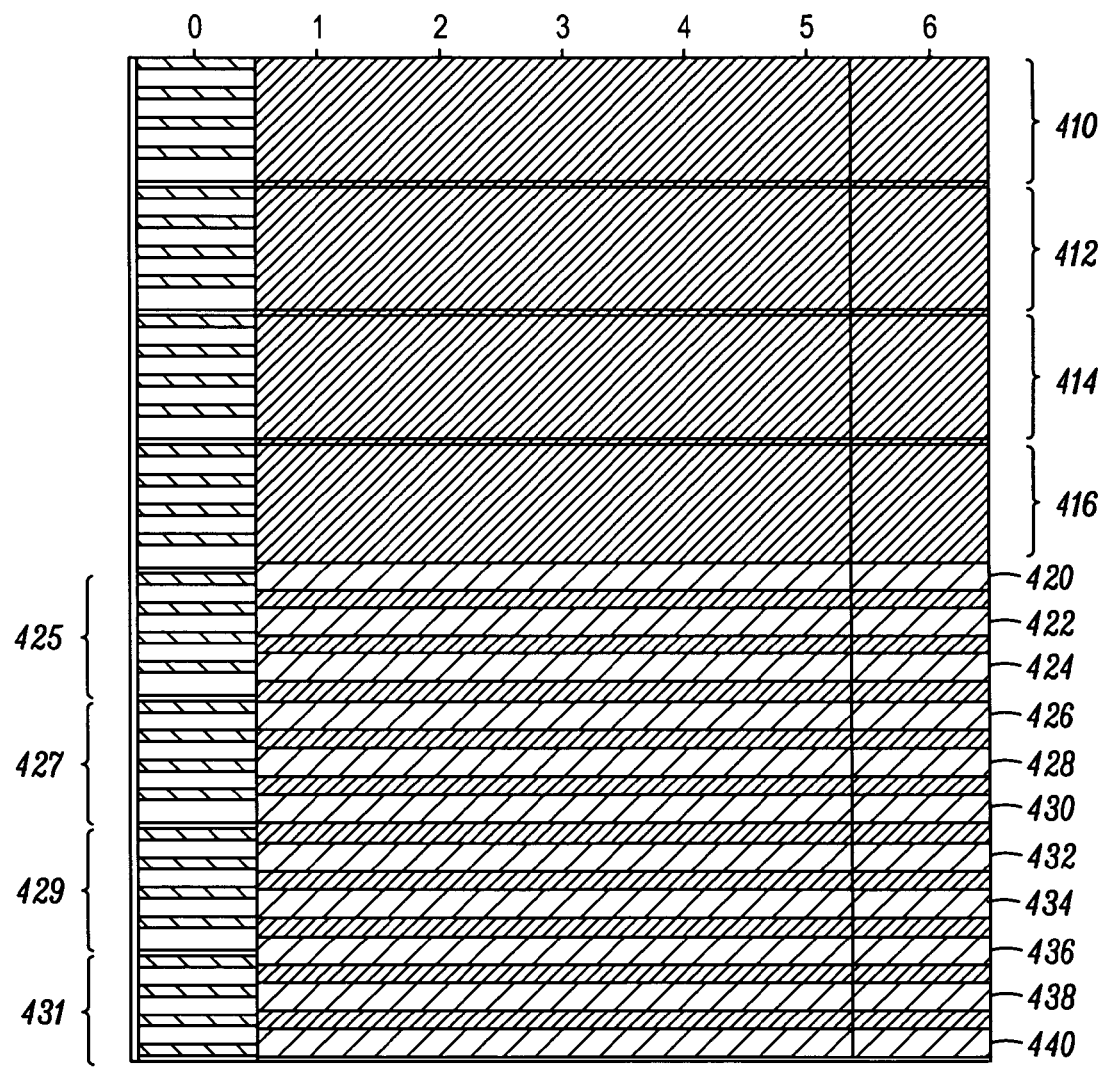
FIG. 4 is another illustrative radio frame having resources assigned to FS and FNS users.

FIG. 4 illustrates another resource assignment scheme wherein sub-channels are assigned to different FS users and sub-carriers of other sub-channels are assigned to FNS users during the same time interval, wherein the first and second frequency resources are part of a common frequency channel. Particularly, sub-channels 410, 412, 414 and 416 are assigned to a single FS user during one time interval. The sub-channels assigned to the FS user include at least two near contiguous sub-carriers by virtue of the adjacency of sub-carriers within a sub-channel. Sub-carriers 420, 422, 424, 426, 428, 430, 432, 434, 436, 438 and 440 of sub-channels 425, 427, 429 and 431 are assigned to the FNS user. The remaining sub-carriers of sub-channels 425, 427, 429 and 431 may be assigned to other FNS users. The sub-carriers assigned to the FNS users are non-contiguous and thus frequency diverse.

Figure 5:
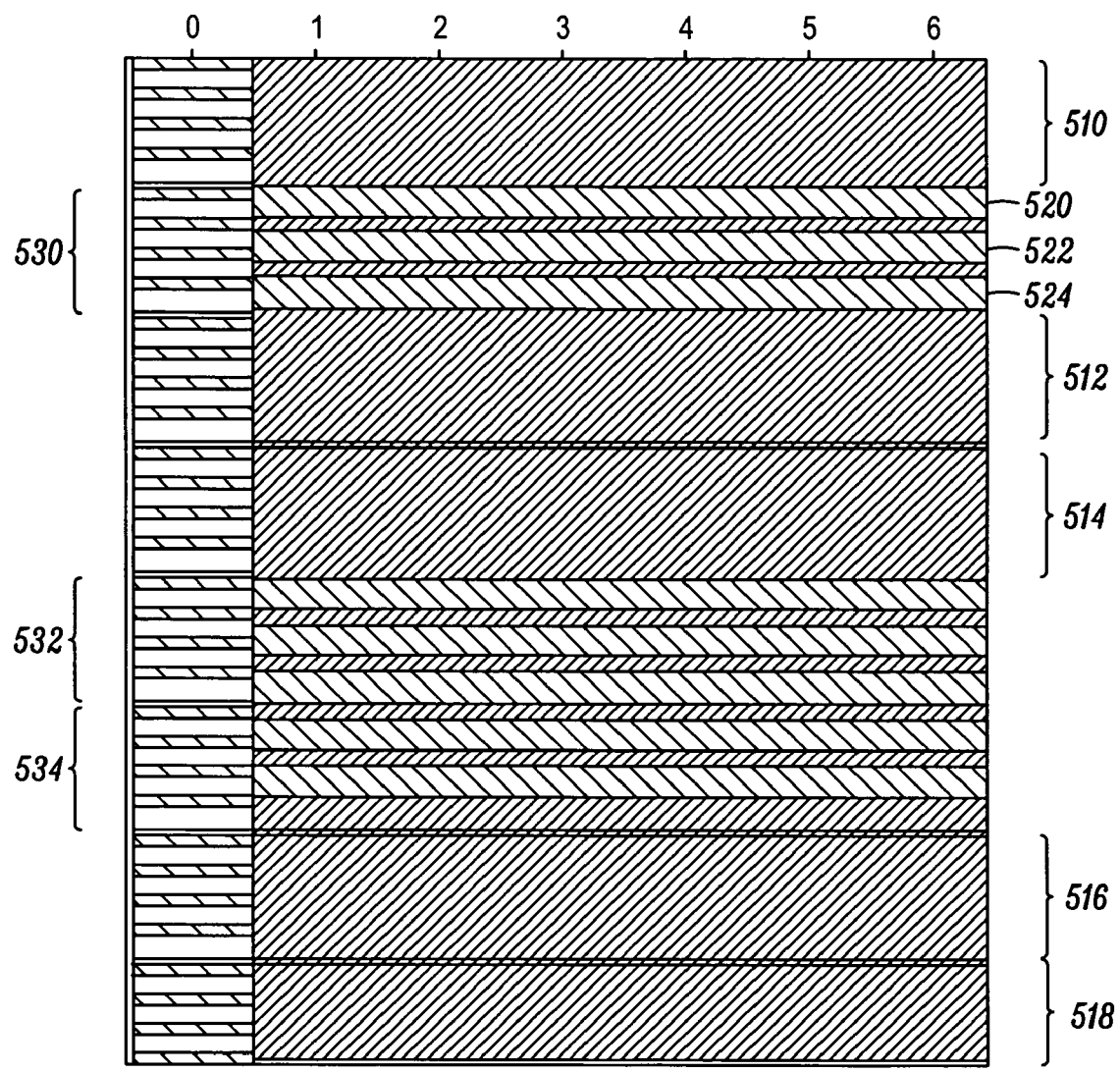
FIG. 5 is another illustrative radio frame having resources assigned to FS and FNS users.

FIG. 5 illustrates another particular embodiment where sub-channels 510, 512, 514, 516 and 518 are assigned to a single FS user during one time interval. The sub-channels assigned to the FS user include at least two near contiguous sub-carriers by virtue of the adjacency of sub-carriers within a sub-channel. Sub-carriers 520, 522 and 524 of sub-channel 530 and sub-carriers of sub-channels 532 and 534 are assigned to one FNS user. The remaining sub-carriers of sub-channels 530, 532 and 534 are assigned to other FNS users. The sub-carriers assigned to the FNS users are non-contiguous and thus frequency diverse.

The control channel structure for assigning sub-channels to FS and FNS users generally comprises a FS user assignment block for identifying one or more FS users and a FNS user assignment block for identifying one or more FNS users and one or more sub-channels assigned thereto. The FNS user assignment block also includes a first unique sub-channel assigned to each FNS user, a number of unique sub-channels assigned to each FNS user, and a sub-channel skip factor for each FNS user. In one embodiment, each sub-channel assigned to each FNS user includes at least one sub-carrier, wherein the sub-channels assigned to each FNS user are selected from a group of sub-channels not assigned to FS users.

The FS user assignment block and the FNS user assignment block occupy a common time interval, for example, in the control/pilot symbol 220 illustrated in FIG. 2. In FIG. 3, for example, the first sub-channel assigned to one FNS user is sub-channel 320, the skip factor is four (4) since the next sub-channel 322 assigned to the same FNS user is four sub-channels away from the first sub-channel. The number of sub-channels assigned to the same user is two (2). The first sub-channel assigned may be indicated in the assignment to be sent on the control channel as a starting channel number or offset into the common frequency channel. For example, sub-channel 320 may be indicated as offset 1 if the first sub-channel is labeled 0, or indicated as offset 2 if the first sub-channel is labeled 1. The offset and skip factor may occupy separate fields in the assignment message, or may be jointly coded to use the same total number of bits. In another embodiment with regard to FIG. 3, after the sub-channel assignment to the FS users the left over sub-channels 320, 330, 322, 332 corresponding to the second frequency resource assignment are renumbered 0, 1, 2, 3 such that the skip factor is one (1) for each of the two FNS users but each FNS user has a different sub-channel offset with 0 for the first FNS user and 1 for the second FNS user.

In an alternative embodiment, the FNS user assignment block includes a first unique sub-carrier assigned to each FNS user, a number of unique sub-carriers assigned to each FNS user, and a sub-carrier skip factor for each FNS user. FIG. 4 illustrates the case where sub-carriers, rather than sub-channels, are assigned to FNS users. In another embodiment with regard to FIG. 3, after the sub-channel assignment to the FS users the leftover sub-channels 320, 330, 322, 332 corresponding to the second frequency resource assignment are renumbered 0, 1, 2, 3 such that the skip factor is one (1) for each of the two FNS users but each FNS user has a different sub-channel offset with 0 for the first FNS user and 1 for the second FNS user. The FS and FNS user assignments are sent to users over a control channel, as discussed further below.

In one embodiment, the control channel structure includes a first unique list including at least one sub-channel assigned to each FS user, wherein each sub-channel assigned to each FS user includes at least two near-contiguous sub-carriers as discussed above. In another embodiment, the control channel structure includes a field identifying FS resources. The field may be in the form of a bit map that identifies FS and FNS resources wherein "1" or "0" may be used to indicate whether a particular resource is assigned to FS or FNS users. In another embodiment, the control channel structure includes a field indicating whether both FS and FNS users have been allocated resources. For example, a "1" bit at the beginning of the frame may be used to indicate that assignments are mixed. In other embodiments, the bit may be used to indicate that the assignments all are either for all FN or FNS users. The FS and FNS user assignment blocks, whether in the form of a bit map or tree structure, and any other data, including CRC, tail bits, etc. are generally mapped to the control channel using means and schemes well known to those having ordinary skill in the art.

In one embodiment, the control channel structure is generated for assigning sub-channels to FS and FNS users by assigning each FS user at least one unique sub-channel from a group of sub-channels before assigning sub-channels to any FNS users, and then assigning each FNS user a first unique sub-channel, a number of unique sub-channels, and a sub-channel skip factor, wherein the sub-channels assigned to each FNS user are selected from a group of sub-channels remaining after the assignment of sub-channels to the FS users. In some embodiments, the group of sub-channels remaining after the assignment of sub-channels to FS users is re-numbered, and each FNS user is assigned the first unique sub-channel, the number of unique sub-channels, and the sub-channel skip factor based on the re-numbered sub-channels. In frequency hoping applications wherein one of the FNS users is a frequency hopping user, each frequency hopping FNS user is assigned a frequency hopping factor, wherein the frequency hopping factor is based on the re-numbered sub-channels.

While the present disclosure and the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims.

What is claimed is:

1. A method for assigning frequency selective (FS) and frequency non-selective (FNS) resources to users in an orthogonal frequency-division multiplexing (OFDM) wireless communication system, the method comprising:
assigning, at a scheduling entity, a FS frequency resource to a first user during a time interval,
the FS frequency resource assignment includes at least two contiguous sub-channels;
assigning a FNS frequency resource to a second user during the same time interval,
the FNS frequency resource assignment includes at least two sub-channels non-contiguous in frequency,
wherein the FS resource and FNS resource assignments are part of a common frequency channel and wherein the at least two non-contiguous sub-channels of the FNS frequency resource assignment are separated by not less than one quarter of the common frequency channel.

2. The method of claim 1, channel coding and interleaving data for each user over the correspondingly assigned frequency resources.

3. The method of claim 2, the channel coding and interleaving data to form one or more codewords.

4. The method of claim 3, each codeword of the one or more codewords is of size smaller than or equal to a maximum codeword size.

5. The method of claim 1, assigning the FS frequency resource to the first user based on reported frequency signal quality information received from the first user.

6. The method of claim 1, each of the sub-channels assigned to the first and second users including at least two contiguous sub-carriers and at least two contiguous symbols.

7. A method in a wireless communication network entity, the method comprising:
transmitting a first resource sub-channel assignment to a first user;
the first resource sub-channel assignment including a first sub-channel assigned to the first user, a number of sub-channels assigned to the first user, and a sub-channel skip factor for the first user;
transmitting a second resource sub-channel assignment to a second user.

8. The method of claim 7, each sub-channel assigned to the first user including at least two contiguous sub-carriers and at least two contiguous symbols.

9. The method of claim 7, further comprising identifying a resource sub-channel assignment type in a control channel field.

10. The method of claim 9, the resource sub-channel assignment type indicating whether the resource sub-channel assignment is frequency selective or frequency non-selective.

11. The method of claim 7, transmitting the first resource sub-channel assignment on a control channel.

12. The method of claim 7, the first resource sub-channel assignment and the second resource sub-channel assignment have the same total number of bits.

13. The method of claim 12, for each user, the first sub-channel and the number of sub-channels assigned to the user is jointly coded.

14. The method of claim 13, arranging the jointly coding of the first sub-channel and the number of sub-channels according to a tree structure.

15. The method of claim 7, wherein the second resource sub-channel assignment includes a first sub-channel assigned to the second user, and a number of sub-channels assigned to the second user.

16. The method of claim 7, indicating the first sub-channel and the sub-channel skip factor on separate control channel fields of the first resource sub-channel assignment.

17. The method of claim 7, transmitting the first and second resource sub-channel assignments occupying the common time interval in a radio frame comprising a plurality of symbols, wherein the common time interval includes at least a first symbol in the radio frame.

18. The method of claim 17, the first symbol in the radio frame includes pilot information on a first set of sub-carriers and control information on a second set of sub-carriers, wherein the first set of sub-carriers is different than the second set of sub-carriers.

19. A method in a wireless communication network entity, the method comprising:
allocating a resource sub-channel assignment to a wireless communication terminal;
transmitting the resource sub-channel assignment on a control channel to the wireless communication terminal;

the resource sub-channel assignment including a sub-channel assigned to the wireless communication terminal, a number of sub-channels assigned to the wireless communication terminal, and a sub-channel skip factor for the wireless terminal.

20. The method of claim 19, wherein the sub-channel skip factor is indicative of a separation between the sub-channels assigned to the wireless communication terminal.

21. A method in a wireless communication network entity, the method comprising:

transmitting a first resource sub-channel assignment to a first user;

the first resource sub-channel assignment including a first sub-channel assigned to the first user, a number of sub-channels assigned to the first user, and a frequency hopping factor for the first user, the frequency hopping factor is a sub-channel skip factor;

transmitting a second resource sub-channel assignment to a second user.

22. The method of claim 21, each sub-channel assigned to the first user including at least two contiguous sub-carriers and at least two contiguous symbols.

23. The method of claim 21, further comprising identifying a resource sub-channel assignment type in a control channel field, the resource sub-channel assignment type indicating whether the resource sub-channel assignment is frequency hopping or non-frequency hopping.

* * * * *